Aug. 21, 1923.
M. M. SHERWOOD
REMOVABLE CALK
Filed Feb. 27, 1922
1,465,794
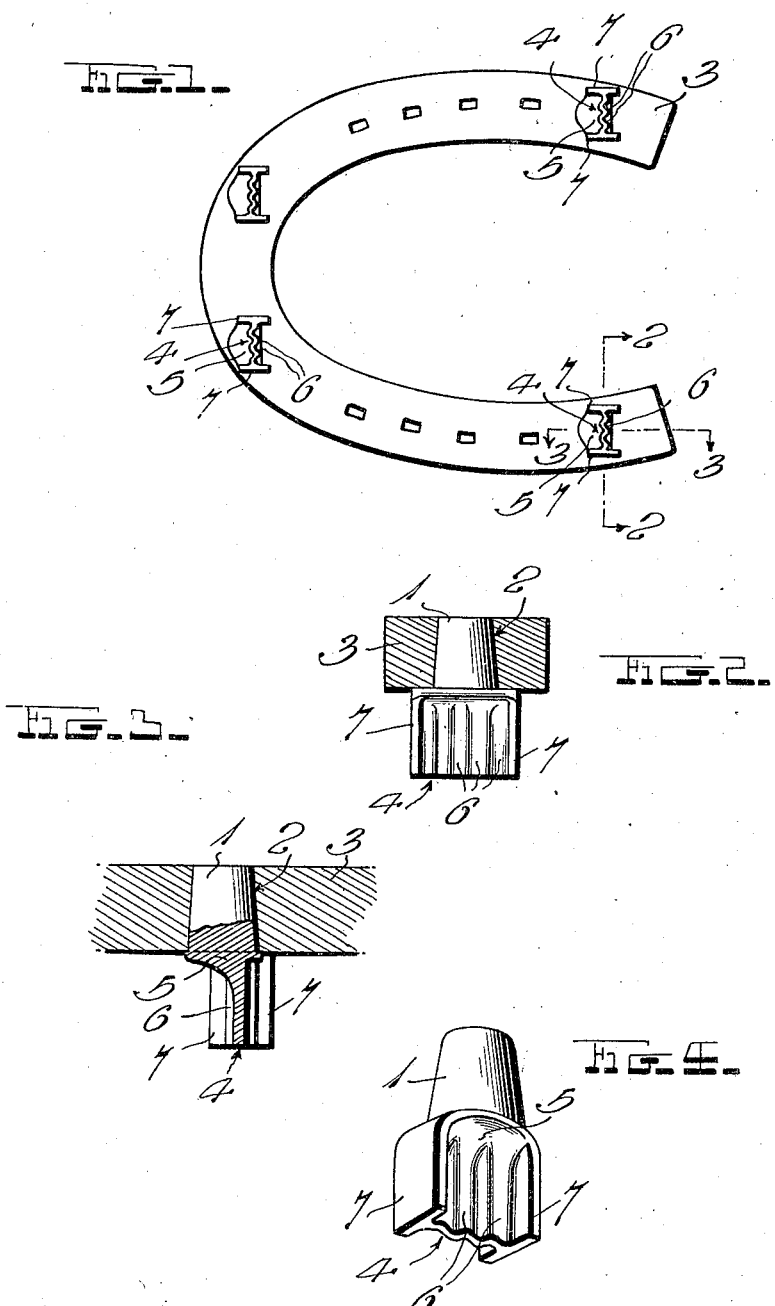
Witness
H. Woodard
Inventor
M. M. Sherwood
By H. B. Willson Yeo
Attorneys Patented Aug. 21, 1923.

1,465,794

UNITED STATES PATENT OFFICE.

MATTHEW M. SHERWOOD, OF SCRANTON, PENNSYLVANIA.

REMOVABLE CALK.

Application filed February 27, 1922. Serial No. 539,609.

*To all whom it may concern:*

Be it known that I, MATTHEW M. SHERWOOD, a citizen of the United States, residing at Scranton, in the county of Lackawanna and State of Pennsylvania, have invented certain new and useful Improvements in Removable Calks; and I do declare the following to be a full, clear, and exact description of the invention, such as will enable others skilled in the art to which it appertains to make and use the same.

This invention relates to a removable calk for horseshoes.

The object of the invention is to generally improve upon calks of this class by providing one wherein the ground-engaging or body portion is longitudinally corrugated to provide a self-sharpening calk, the same remaining sharp and being effective in use until practically worn out.

More specifically speaking, it is another object of the invention to devise a detachable calk for horseshoes which embodies a shank to be driven into an opening in the horseshoe, together with a corrugated or fluted plate-like body portion having widened end pieces for reinforcing the calk and for preventing side slipping.

Other objects and advantages of the invention will be apparent during the course of the following description.

In the accompanying drawings forming a part of this specification and in which like numerals are employed to designate like parts throughout the same:

Figure 1 is a bottom plan view of a horseshoe equipped with a plurality of calks constructed in accordance with this invention;

Fig. 2 is an enlarged detail section taken on the line 2—2 of Fig. 1;

Fig. 3 is a section taken on the line 3—3 of Fig. 1; and

Fig. 4 is a detail perspective view of the improved calk, showing a slight modification.

In carrying out the invention, I make use of a one-piece metal body constructed to provide a tapered shank 1 designed to be driven into and held frictionally in a tapered opening 2 formed in the horseshoe 3 as is usual. Associated with the shank is a relatively thin plate-like part 4 which constitutes the ground-engaging means. By carefully examining this part 4, it will be seen that it is substantially rectangular in side elevation and is thickened at its point of connection with the shank as at 5 (see Fig. 3). As before indicated, the part of the calk under consideration is so constructed as to more effectively prevent slipping and to render it "self-sharpening." In accomplishing this result, said part 4 is simply longitudinally corrugated to provide a plurality of vertical flutes 6. With this construction, it will be seen that a sharp edge will be provided at all times until the ground-engaging portion 4 is substantially worn down to its point of connection with the attaching shank 1.

To decidedly increase the rigidity of the calk and to assist in eliminating side slipping as might otherwise occur, I provide widened end pieces 7 which are integral with the body portion 4, these end pieces being so arranged that they extend at right angles to and equal distances on opposite sides of the body. Attention is here directed to the fact that the top portions of these end pieces 7 may be either arched as seen in Fig. 4, or flat as seen in Figs. 2 and 3 for more effective contact with the under side of the shoe.

In use, the several calks are driven into the tapered openings 2 in the horseshoe 3 in the usual way, or as shown in Fig. 1, and when in this position, the widened end pieces 7 of the calks serve to prevent transverse or side slipping of the shoe, while the corrugated body portion between them serves to eliminate slipping in all other directions. As before indicated, no matter how much the corrugated body portion is worn, an effective and comparatively sharp edge is continually presented for enabling the proper traction to be obtained.

By carefully considering the description in connection with the drawings, persons familiar with devices of this class will doubtless be able to obtain a clear understanding of the invention. Therefore, a more lengthy and detailed description is deemed unnecessary. It may be mentioned however that the corrugated body portion 4 in connection with the widened end pieces 7 provides a sufficient ground-engaging lower end to the calk to enable it to effectively grip smooth or slippery streets, and since this same engaging area remains as the calk wears away, it will have a long life and will be effective until worn down to the shoe.

I claim:

A detachable calk for horseshoes comprising a one-piece body including a tapered shank to be driven into an opening in the horseshoe, a substantially rectangular plate-like part connected with the shank, said part being comparatively thin at its bottom and gradually increasing in thickness towards its top, and being longitudinally corrugated from one vertical end to the opposite vertical end to render it selfsharpening and ever sharp, and relatively wide end-pieces bordering the top and vertical edges of said plate-like part, said end-pieces being integral therewith and disposed at right angles thereto and extending equal distances on opposite sides of said part.

In testimony whereof I have hereunto set my hand.

MATTHEW M. SHERWOOD.